(12) United States Patent
Bardaré et al.

(10) Patent No.: US 12,539,536 B2
(45) Date of Patent: Feb. 3, 2026

(54) BLIND RIVET SETTING TOOL

(71) Applicant: BLACK & DECKER INC., New Britain, CT (US)

(72) Inventors: Luca Bardaré, Idstein (DE); Tobias Heep, Idstein (DE); Kevin Bhikadiya, Idstein (DE); Yasar Akbaba, Idstein (DE); Philipp Libera, Taunusstein Wehen (DE); Benjamin Schmidt, Idstein (DE)

(73) Assignee: BLACK & DECKER INC.

( * ) Notice: Subject to any disclaimer, the term of this patent is extended or adjusted under 35 U.S.C. 154(b) by 92 days.

(21) Appl. No.: 18/152,357

(22) Filed: Jan. 10, 2023

(65) Prior Publication Data

US 2023/0264253 A1 Aug. 24, 2023

(30) Foreign Application Priority Data

Feb. 22, 2022 (GB) .................................. 2202371.7
Mar. 15, 2022 (GB) .................................. 2203576.0

(51) Int. Cl.
| | |
|---|---|
| B21J 15/10 | (2006.01) |
| B21J 15/04 | (2006.01) |
| B21J 15/26 | (2006.01) |
| B21J 15/32 | (2006.01) |
| B21J 15/38 | (2006.01) |

(52) U.S. Cl.
CPC .......... B21J 15/105 (2013.01); B21J 15/043 (2013.01); B21J 15/32 (2013.01); B21J 15/326 (2013.01); B21J 15/383 (2013.01); B21J 15/386 (2013.01); B21J 15/26 (2013.01)

(58) Field of Classification Search
CPC .. B21J 15/043; B21J 15/105; B21J 15/16–26; B21J 15/30; B21J 15/32
See application file for complete search history.

(56) References Cited

U.S. PATENT DOCUMENTS

| | | | |
|---|---|---|---|
| 5,323,521 A * | 6/1994 | Freund | B21J 15/043 |
| | | | 29/243.527 |
| 5,603,151 A | 2/1997 | Wille | |
| 5,647,209 A * | 7/1997 | Wilcox | B21J 15/22 |
| | | | 72/391.2 |
| 6,182,345 B1 * | 2/2001 | Travis | B21J 15/30 |
| | | | 72/391.2 |

(Continued)

FOREIGN PATENT DOCUMENTS

| | | |
|---|---|---|
| EP | 0173817 A1 | 3/1986 |
| EP | 0586134 B1 | 10/1999 |

(Continued)

OTHER PUBLICATIONS

Extended EP Search Report dated Jun. 27, 2023 cited in corresponding EP Patent Application No. 22211207.0.

(Continued)

*Primary Examiner* — Matthew P Travers
(74) *Attorney, Agent, or Firm* — Jordan IP Law, LLC; Todd A. Vaughn

(57) ABSTRACT

A blind rivet setting tool including a clamping assembly for releasably clamping a nosepiece in place such that a blind rivet can bear against the nosepiece while the mandrel thereof is pulled; and a method of changing nosepieces using the clamping assembly.

19 Claims, 13 Drawing Sheets

(56) References Cited

U.S. PATENT DOCUMENTS

| | | | |
|---|---|---|---|
| 7,178,213 | B2 | 2/2007 | Haas et al. |
| 7,530,155 | B1 | 5/2009 | Nikkel |
| 10,058,910 | B2 | 8/2018 | Weyland |
| 10,118,216 | B1 | 11/2018 | Yuan |
| 10,894,284 | B2 | 1/2021 | Leger et al. |
| 11,148,188 | B2 | 10/2021 | Simpson et al. |
| 2020/0139424 | A1* | 5/2020 | Yabuguchi ............... B21J 15/26 |
| 2023/0012107 | A1 | 1/2023 | Kadlecek et al. |

FOREIGN PATENT DOCUMENTS

| | | |
|---|---|---|
| EP | 1364727 A1 | 11/2003 |
| EP | 3025807 B1 | 7/2019 |
| FR | 2709992 A1 | 3/1995 |

OTHER PUBLICATIONS

Office Action dated Jun. 26, 2024 cited in corresponding EP Patent Application No. 22211207.0.

* cited by examiner

BLIND RIVET SETTING TOOL

CROSS-REFERENCE TO RELATED APPLICATIONS

This application claims priority from GB Patent Application No. 2203576.0, filed Mar. 15, 2022, and GB Patent Application No. 2202371.7, filed Feb. 22, 2022, the disclosures of which is incorporated herein by reference in its entirety.

FIELD OF THE INVENTION

This specification relates to blind rivet setting tools.

BACKGROUND OF THE INVENTION

It is well known that blind rivets come in different shapes and sizes. In order for blind rivet setting tools to accommodate different varieties of blind rivets the nosepiece of such tools can be changed depending on the rivet to be set. US2019/0247913A1 discloses a blind rivet setting tool to which different nosepieces can be selectively attached via a threaded engagement. In practice it is typical for a wrench to be used to rotatably drive a selected nosepiece in order to achieve a tight connection.

BRIEF SUMMARY OF THE INVENTION

According to a first aspect of the invention is provided the blind rivet setting tool of claim 1. Optional features are defined by dependent claims 2 to 6. According to a second aspect of the invention is provided the method of claim 7.

BRIEF DESCRIPTION OF THE DRAWINGS

Various aspects and embodiments of the invention will now be described by way of non-limiting example with reference to the accompanying drawings, in which.

DETAILED DESCRIPTION OF THE PREFERRED EMBODIMENT

Figure 1:
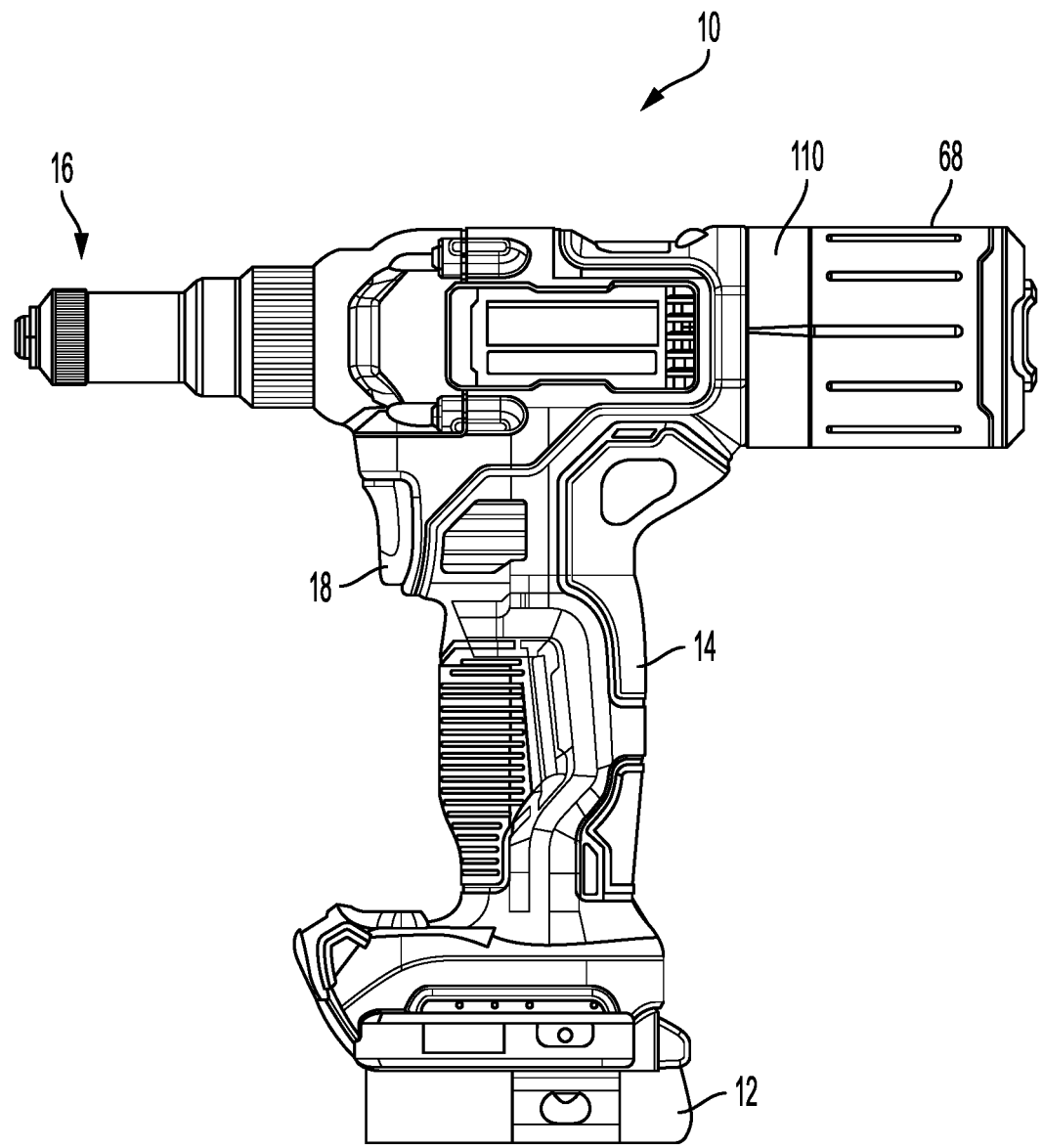
FIG. 1 is a schematic side view of a blind rivet setting tool.
Figure 2:
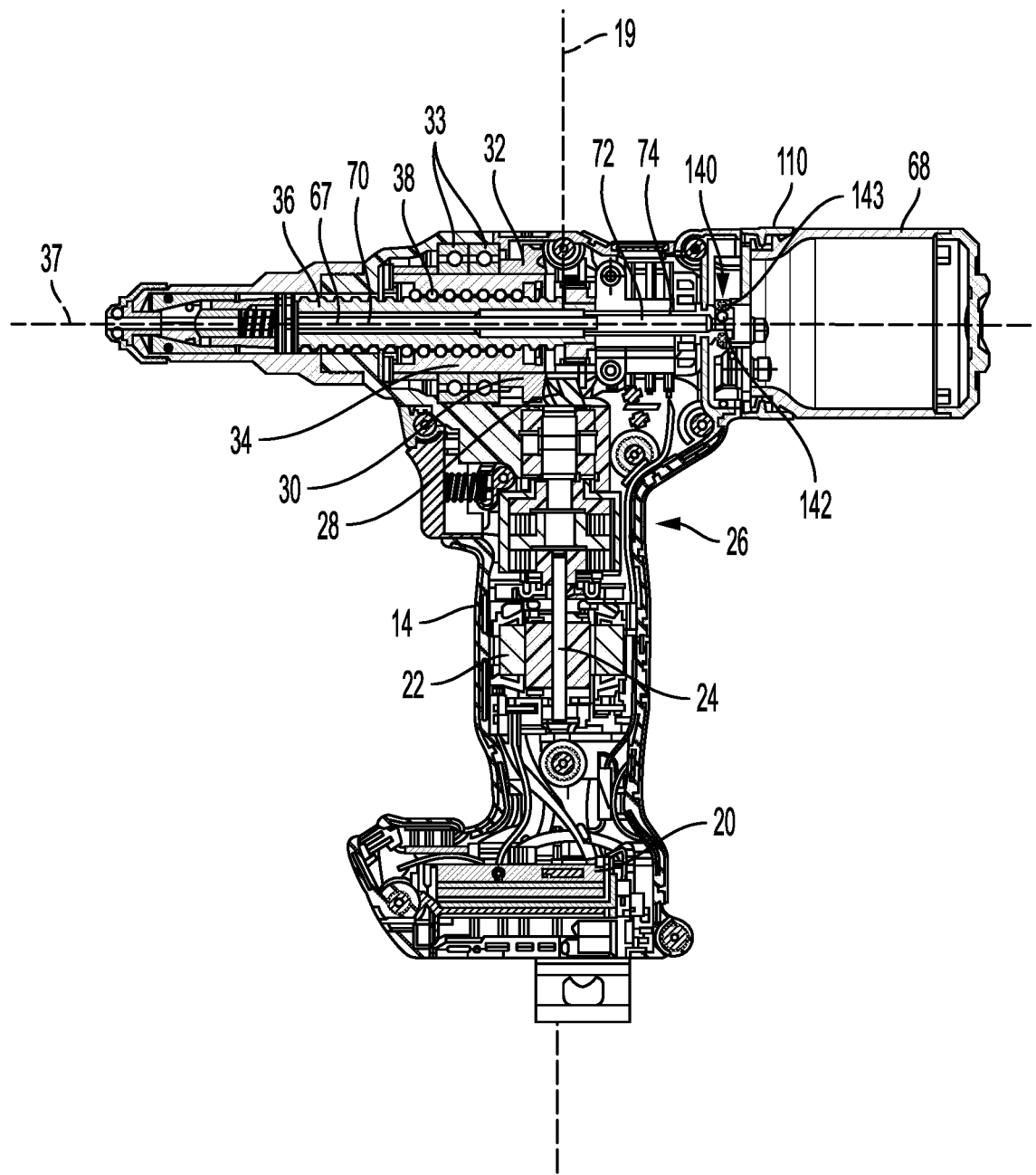
FIG. 2 is a schematic cross-sectional view of the tool in FIG. 1.

FIG. 1 illustrates a blind rivet setting tool 10. The tool 10 is a battery powered cordless tool, wherein the battery 12 is connected at the base of the handle 14. To use the tool 10 a user inserts the mandrel of a blind rivet into the nose 16 of the tool 10 and pulls the trigger 18. Referring to FIG. 2 operation of the tool 10 is electronically controlled by a controller 20. In response to the controller 20 receiving input indicative that the trigger 18 is pulled by a user holding the handle 14 the controller 20 actuates a motor 22 located in the handle 14, thereby causing rotation of the motor output shaft 24. Torque from the motor shaft 24 is transferred via a transmission 26 to a first bevel gear 28. The transmission 26 comprises series of planetary gear arrangements for reducing output speed while increasing torque, whereby the first bevel gear 28 rotates at a lower speed than the motor output shaft 24 however with increased torque relative to the output shaft 24. The output shaft 24 of the motor 22, transmission 26 and bevel gear 28 are aligned along an axis 19 which extends along the length of the handle 14. By additionally locating the battery 12 on the same axis 19 weight distribution of the tool 10 is optimised. The battery 12 is releasably attached to the base of the handle 14, in particular to a battery attachment feature of the tool 10 whereby such attachment features are known; the battery 12 is not shown in FIG. 2 and so it has been separated from the battery attachment feature of the tool 10.

A second bevel gear 30 is provided on the end face of a driving sleeve 32. The driving sleeve 32 is rotationally fixed relative to an input sleeve 34 of a ball screw arrangement. The driving sleeve 32 and input sleeve 34 can be rotationally fixed relative to each other due to a friction fit arrangement, however alternatively they could be rotationally fixed due to an interlocking arrangement such as a spline fit arrangement or other male and female interlocking-type arrangement.

An internal surface of the input sleeve 34 defines a threaded surface. The outer surface of the input sleeve 34 is supported by bearings 33 which enable rotation of the input sleeve 34. The outer surface of a screw 36 extending through the input sleeve 34 is provided with a threaded surface. A plurality of balls 38 one of which is denoted in FIG. 2, such as metal balls, ride in the opposing threaded surfaces of the input sleeve 34 and screw 36, thereby defining a ball screw arrangement. As a result, when the input sleeve 34 is rotatably driven by the driving sleeve 32 this causes axial movement of the screw 36. In other words, torque from the motor 22 is transferred through the transmission 26, bevel gears 28, 30 and driving sleeve 32 to the input sleeve 34, whereby rotation thereof causes axial movement of the screw 36. The screw is supported so that it can only move axially along an axis. Rotating the input sleeve 34 in opposite directions causes the screw 36 to move in opposite directions along the axis 37.

Figure 3:
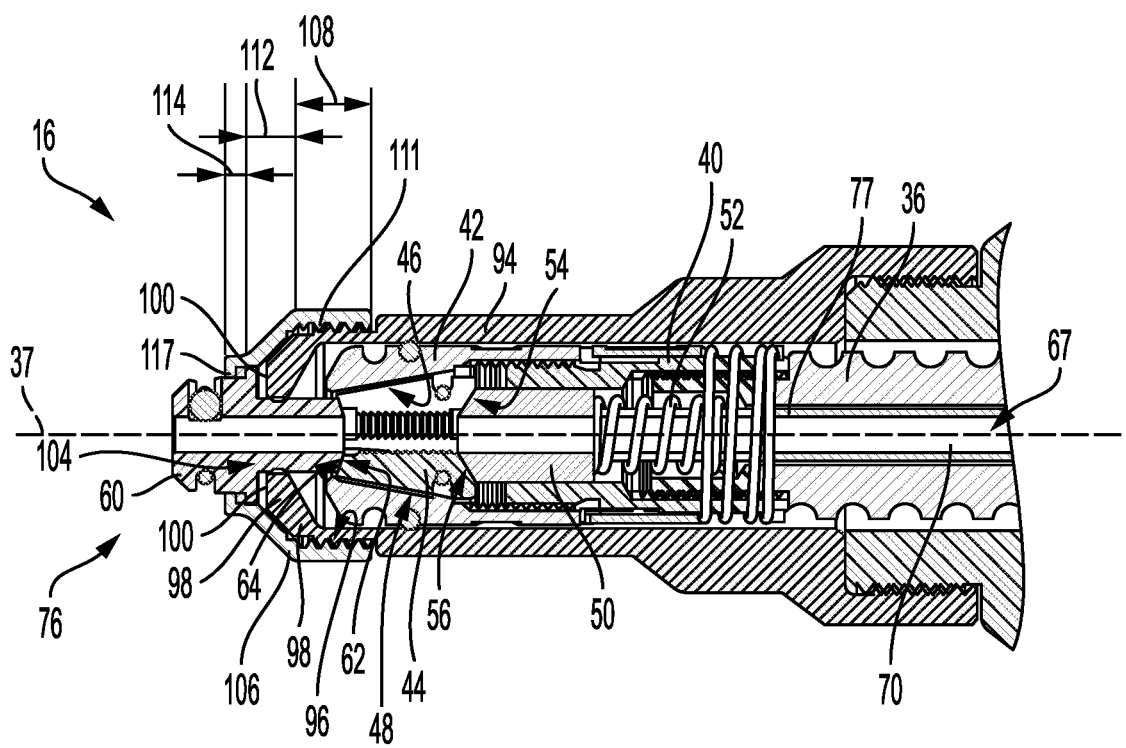
FIG. 3 is a close-up of part of the drawing in FIG. 2.

Now referring to FIG. 3 a connecting sleeve 40 is threadably attached to a distal end of the screw 36. A pull back hull 42 is threadably attached to the connecting sleeve 40. Axial movement of the screw 36 causes axial movement of the pull back hull 42. A plurality of circumferentially arranged jaws 44 are located in the pull back hull 42. Each of the jaws 44 has a ramped outer surface 46 for engaging a conical inner surface 48 defined by the pullback hull 42. A separator sleeve 50 is forced by a spring 52 against the jaws 44. More specifically a ramped front surface 54 of the separator sleeve 50 is forced against a ramped rear surface 56 of the jaws 44.

A nosepiece 60 is releasably attached at the opening to the nose 16 of the tool. In use a mandrel of a blind rivet is inserted through the nose piece 60 such that the mandrel extends between the jaws 44. Upon pulling the trigger 18 the controller 20 causes the screw 36 to be moved axially such that it retracts into the tool (moves to the right in FIG. 3 along the axis 37), whereby the pullback hull 42 moves with the screw 36. Due to engagement of the opposing ramped surfaces 46, 48 the jaws 44 are caused to move radially inwards, for gripping the mandrel, and also backwards for pulling the mandrel. Accordingly, the blind rivet is pulled against the nose piece such that it deforms for setting the blind rivet. When the mandrel of the blind rivet is pulled far enough its mandrel snaps. The blind rivet will thus be set in place, however, yet to do is to dispose of the broken mandrel.

During a reset operation of the tool 10 the controller 20 causes the screw 36 to be moved axially such that it moves in the opposition direction (moves to the left in FIG. 3 along the axis 37), whereby the pullback hull 42 moves with the screw 36. The front of each jaw 44 defines a front ramped surface 62 which is configured to cooperate with an annular ramped surface 64 of the nose piece 60. In particular when the pullback hull 42 has been moved far enough in the reset direction (to the left in FIG. 3) the front ramped surface 62 of the jaws 44 will engage the annular ramped surface 64 of the nose piece 60. Due to the separator sleeve 50 being forced against the jaws 44 by the spring 52 the front ramped surfaces 62 of the jaws 44 will ride along the annular ramped surface 64 of the nose piece 60 and the rear surfaces 56 of the jaws 44 will ride along the ramped front surface 54 of the separator sleeve 50; whereby the jaws 44 move radially outwards for releasing the snapped mandrel.

The released snapped mandrel can then be caused to fall under gravity along an internal path 67 in the direction of a collection chamber 68. The internal path 67 is defined by aligned openings extending through components between the jaws 44 and the collection chamber 68, including a channel 70 extending through the screw 36 along the axis 37 and a channel 72 through a guidance sleeve 74.

Referring to FIGS. 2 and 20 to 22 the guidance sleeve 74 has two axially displaced circumferential projections 75 which receive a housing feature of the tool between them (best shown in FIG. 2) for maintaining the position of the guidance sleeve 74. During manufacturing the guidance sleeve 74 can be snap fitted into place by pushing it against a housing feature of the tool which flexes and subsequently snaps into place between the circumferential projections 75. As for the aforementioned channel 70 extending through the screw 36, this is defined by a sleeve extension 77 protruding from the separator sleeve 50 (best shown in FIG. 3). The separator sleeve 50 and sleeve extension 77 are a single part. The sleeve extension 77 is connected to, and extends from, a rear side of the separator sleeve 50 and extends into the opening through the screw 36.

Referring to FIGS. 2 and 3 when the jaws 44 are at their home position the sleeve extension 77 extends into the guidance sleeve 74 to a first extent (see FIG. 2), whereas when the jaws 44 are pulled back during use of the tool 10 the separator sleeve 50 also moves back and thus causes the sleeve extension 77 to extend further into the guidance sleeve 74. In other words, during backwards and forwards movement of the jaws 44 in use the sleeve extension 77 is caused to move backwards and forwards within the channel 72 through the guidance sleeve 74. It will thus be understood how alignment of the openings extending through the separator sleeve 50, the sleeve extension 77 and the guidance sleeve 74 enable a snapped mandrel to be moved into the collection chamber 68.

How a user of the tool can change the nosepiece 60 will now be explained.

Figure 4:
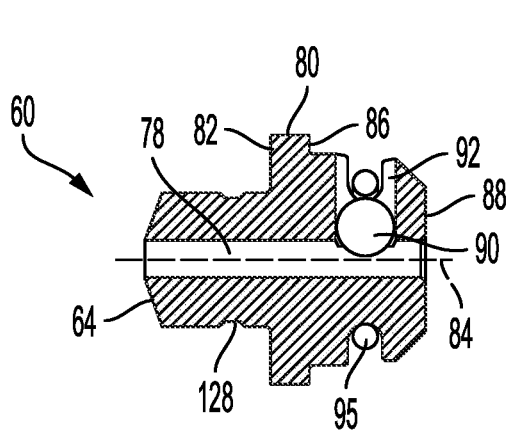
FIG. 4 is a schematic cross-sectional view of a nosepiece.
Figure 5:
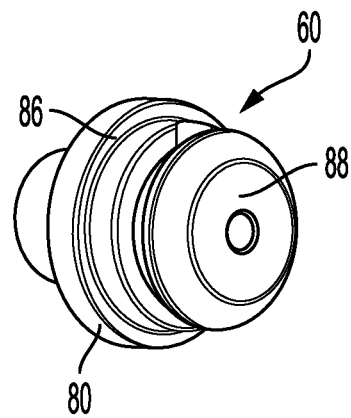
FIGS. 5 and 6 are schematic views of the nosepiece in FIG. 4 from different angles.
Figure 6:
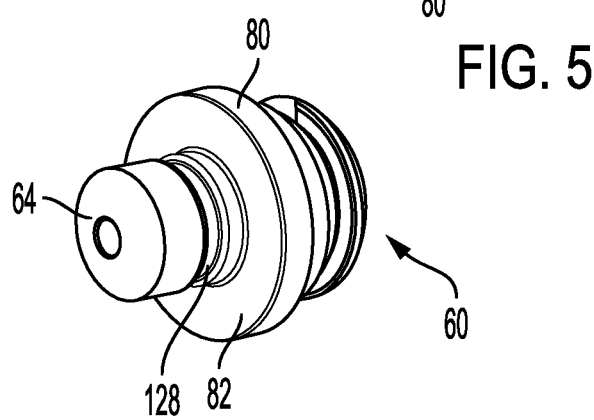

FIGS. 4, 5 and 6 illustrate a nosepiece 60. The nosepiece defines a channel 78 through which the mandrel of a blind rivet can be inserted. The nosepiece has an annular wall 80 which defines a first surface 82 in a plane orthogonal to the axis 84 through the channel 78 (in use the axis 84 aligns with the axis 37 already mentioned). The annular wall 80 also defines a second surface 86, also in a plane orthogonal to the axis 84 through the channel 78, however on the opposite side of the wall 80 to the first surface 82. Also illustrated in FIGS. 4 and 6 is the annular ramped surface 64 of the nose piece 60 which has already been mentioned. A front planar surface portion 88 is defined by the front side of the nosepiece 60. Additionally, a ball 90, such as a metal ball, is received in a recess 92 of the nosepiece 60. The recess 92 defines a conical section with a hole in communication with the channel 78 which is wide enough to let the ball 90 partially extend through the opening into the channel 78. Under bias of an elastic ring 95 the ball 90 is caused to partially protrude into the channel 78, whereby a mandrel extending through the nosepiece 60 can be gripped by the ball 90. In use this prevent blind rivets falling from the tool 10 under their own weight, which improves safety especially when a user is working at height.

Referring to FIG. 3 the nose piece 60 is held in place by clamping means 76.

Figure 8:
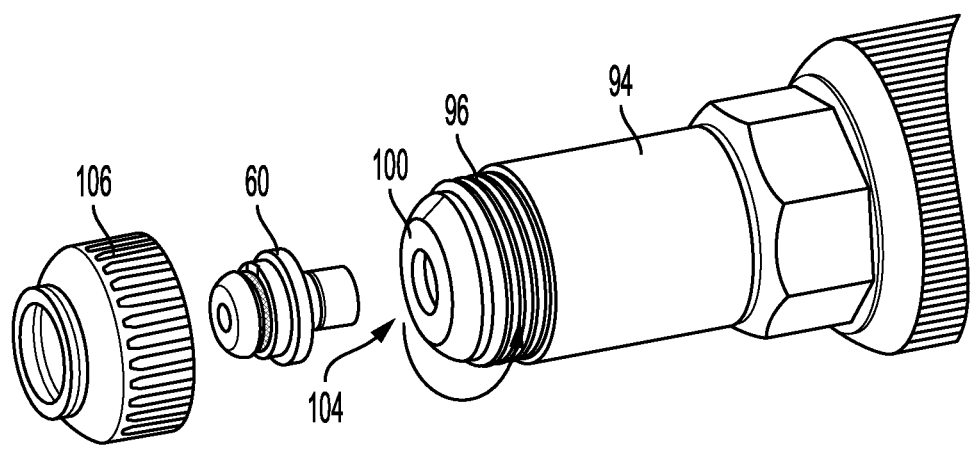
FIG. 8 is a schematic view of the nose of the tool in FIG. 1 with the cap detached.

A first part of the clamping means 76 is a housing part of the tool 10, in particular the jaw housing 94 which embodies part of the nose 16 of the tool 10. A distal end of the jaw housing 94 is provided with a threaded portion 96 around its outer surface and an abutment portion 98 which defines a flat annular surface portion 100 in a plane orthogonal to the aforementioned axis 37. The abutment portion 98 defines a nosepiece receiving opening 104 which extends along the axis 37. FIG. 8 clearly illustrates these features of the jaw housing 94. When a nosepiece 60 is mounted to the tool 10 the end thereof which embodies the annular ramped surface 64 extends through the nosepiece receiving opening 104 of the jaw housing 94.

A second part of the clamping means 76 in the illustrated embodiment is a cap 106. The cap 106 has a first portion 108 which is cylindrical and defines a threaded internal surface 111. The cap 106 has a second portion 112 which is substantially conical and has an internal cross-section which decreases in diameter in a direction away from the internal threaded surface 111. The cap 106 has a third portion 114 provided with an inwardly extending annual lip 117, whereby the annual lip 117 defines a nosepiece receiving opening 118. When the threaded internal surface 111 of the cap 106 is threaded onto the threaded portion 96 of the jaw housing 94 the inwardly extending annular lip 117 urges against the second surface 86 of the nosepiece 60, whereby the first surface 82 of the nosepiece 80 is brought into engagement with the flat annular surface 100 of the jaw housing 94.

In other words, the nosepiece 60 is clamped between the cap 106 and the jaw housing 94 when the cap 106 is threaded onto the jaw housing 94.

In order for the tool 10 to be able to accommodate different sizes of blind rivets the nosepiece 60 can be replaced with a nosepiece suitable to accommodate the blind rivet to be set. In other words, a plurality of nosepieces are provided each having generally the same shape as the nosepiece 60 in FIGS. 4 to 6, however, the specific dimensions of one or more features differ. For example, in other nosepieces the diameter of the channel 78 may be wider or narrower to accommodate blind rivets having wider or shorter mandrels respectively. In other nosepieces the thickness of the wall 80 between the first and second surfaces 82, 86 may be wider or narrower. In other nosepieces the length of the nosepiece extending from the first surface 82 to the ramped annular surface 64 may be longer or shorter. In other nosepieces the ball/elastic band safety mechanism may not be provided. Persons skilled in the art will understand how other nosepieces may differ relative to the nosepiece 60 in order to enable the tool 10 to accommodate blind rivets of different varieties.

Figure 7:
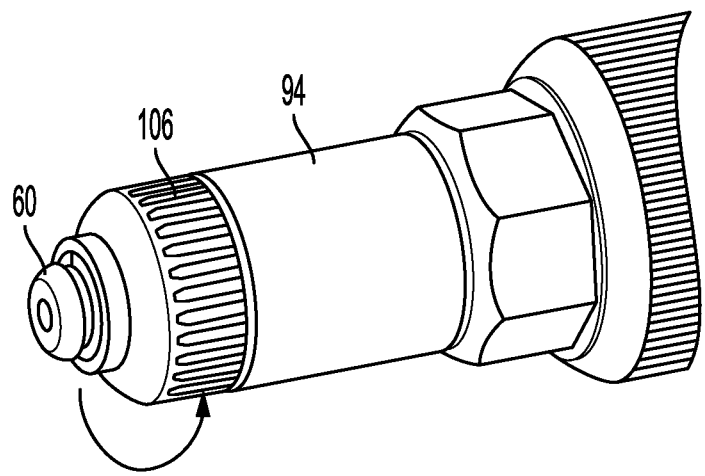
FIG. 7 is a schematic view of the nose of the tool in FIG. 1 with the cap attached.

Now referring to FIGS. 7 and 8, a user can quickly and easily exchange the nosepiece 60 with another nosepiece. The user simply removes the cap 106 by twisting it. The nosepiece 60 is then ejected due to the spring 52 pushing the separator sleeve 50 and thereby the jaws 44 against the nosepiece. A selected nosepiece can then be inserted into the nosepiece receiving opening 104 of the jaw housing 94 as heretofore described. Finally, the cap 106 is re-attached by twisting it back into threaded engagement with the jaw housing 94. As a result, the newly selected nosepiece is clamped in place ready for use.

Figure 13:
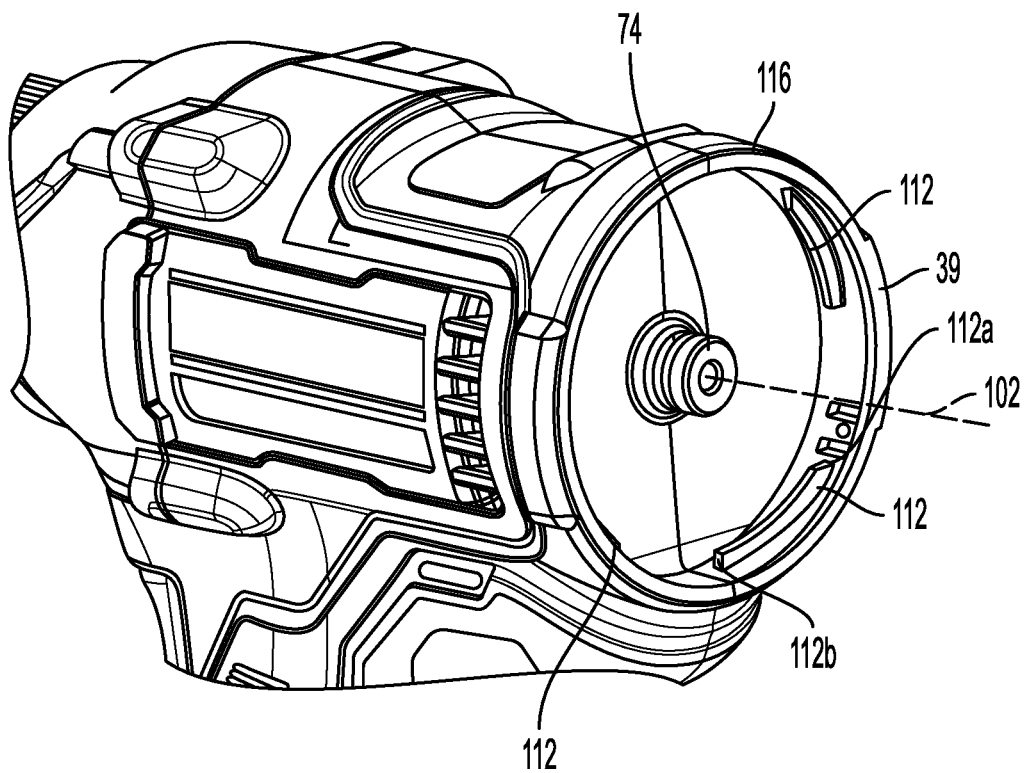
FIG. 13 is a schematic view of the rear housing part of the tool in FIG. 1.

To help users carry around multiple nosepieces the tool 10 is provided with a nosepiece storage unit 110. Referring to FIGS. 9 to 12 the nosepiece storage unit 110 can be releasably connected to the tool 10. With reference to FIG. 13 a rear housing part 116 of the tool 10 is provided with a first part of a two-part connection mechanism. The nosepiece storage unit 110 is provided with the second part of the two-part connection mechanism. The nosepiece storage unit 110 can be attached to and detached from the rear housing part 116 of the tool 10 by engaging and disengaging respectively the two-part engagement mechanism.

In the illustrated embodiment the first part of the two-part engagement mechanism is defined by four evenly circumferentially displaced projections 112 (only three of which are visible in FIG. 13) which inwardly protrude from the rear housing part 116. The projections 112 themselves are not exactly circumferentially extending and are slightly offset to a plane which is orthogonal to the heretofore described axis 37, wherein a first end 112a of each projection 112 is closer to a distal annular surface 39 of the rear housing part 116 than the other end 112b of each projection 112.

Referring back to FIGS. 9 to 12 the nosepiece storage unit 110 is substantially cylindrical and defines at its centre a mandrel receiving opening 120 which will be described later. An axis 121 extending through the mandrel receiving opening 120 aligns with the axis 37 of the tool 10 when the nosepiece storage unit 110 is mounted to the rear housing part 116 of the tool. The second part of the two-part engagement mechanism is defined by four evenly circumferentially displaced fingers 114, each carrying an outwardly protruding projection 116. The fingers 114 extend in a front-side direction of the nosepiece storage unit 110. Like the projections 112 described in the previous paragraph the projections 116 are not exactly circumferentially extending and are slightly offset to a plane which is orthogonal to the axis 121, wherein for each projection 116 a first end 116a thereof is closer to a distal end of the finger on which it is provided than the other end 116b of the projection 116.

The nosepiece storage unit 110 can be attached to the tool 10 by interlocking the outwardly protruding projections 116 of the nosepiece storage unit 110 with the inwardly protruding projections 112 of the rear housing part 116. The ramped nature of the projections 112, 114 provides a bayonet-type attachment mechanism whereby the nosepiece storage unit 110 and rear housing part 116 to be drawn towards each other upon twisting the nosepiece storage unit 110 in order to engage the two sets of projections 112, 114.

With continued reference to FIGS. 9 to 12 the nosepiece storage unit 110 has a planar surface portion 118 which is configured to be orthogonal to the aforementioned axis 121; meaning that the planar surface portion 118 is orthogonal to the axis 37 when the nosepiece storage unit 110 is mounted to the rear housing part 116 of the tool 10. The mandrel receiving opening 120 extends through the planar surface portion 118. An annular lip 119 is provided on the front-side of the planar surface portion 118 and extends around the mandrel receiving opening 120 for cooperating with the guidance sleeve 74 of the tool (see FIG. 2) to provide an extension to the channel 72. In other words when the nosepiece storage unit 110 is mounted to the rear housing part 116, a snapped mandrel exiting the channel 72 defined by the guidance sleeve 74 passes through the lip 119 and thereby the mandrel receiving opening 120.

Figure 14:
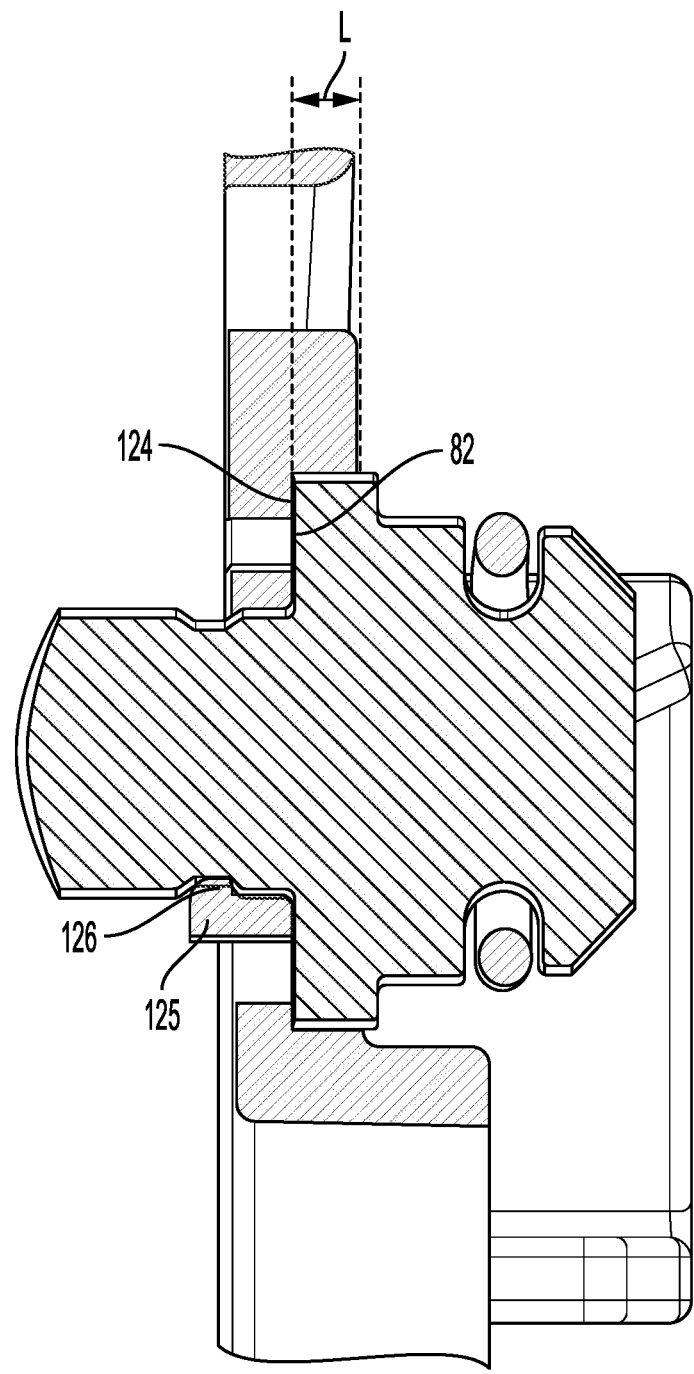
FIG. 14 is a schematic cross-sectional view of a nosepiece receiving portion of the nosepiece storage unit holding a nosepiece.

Nosepiece receiving portions 122 are distributed around the mandrel receiving opening 120. Each nosepiece receiving portion 122 has an annular recess 124 which extends into the planar surface portion 118 from the front-side of the planar surface portion 118. Furthermore, an opening 123 extends through the depressed surface portion 124, whereby the annular recess 124 can also be termed a depressed annular portion 124. Each nosepiece receiving portion 122, on the rear side thereof, is provided with a plurality of evenly circumferentially distributed fingers 125. The fingers 125 are each provided with a hook portion 126 which is configured to snap-fit with a nosepiece. Referring back to FIGS. 4 to 6, nosepieces are provided with a circumferential depression 128. Now referring to FIG. 14, to mount a nosepiece in a nosepiece receiving portion 122 of the nosepiece storage unit 110 the end of the nosepiece embodying the annular ramped surface 64 is pushed through the opening 123 of the nosepiece receiving portion 122 from the front-side thereof. Such action causes the fingers 125 to flex, whereby the hooks 126 thereof snap-fit with the circumferential depression 128 of the nosepiece and the first surface 82 of the nosepiece 60 engages the depressed annular portion 124 of the nosepiece receiving portion 122. To remove a mounted nosepiece it will be appreciated that a user simply needs to pull on the nosepiece which will causes flexing of the fingers 125 in order to release the nosepiece. The nosepiece storage unit 110 can be formed of plastic or other material capable of fulfilling the described functionality.

Although the illustrated nosepiece storage unit 110 has three nosepiece receiving portions 122 for releasably holding nosepieces of different dimensions, it will be appreciated that the nosepiece storage unit 110 can be provided with more or fewer than three such nosepiece receiving portions 122. Persons skilled in the art have freedom to provide as many or as few nosepiece receiving portions 122 as needed within the space limitations of the planar surface portion 118. Weight distribution of the nosepiece storage unit 110 can be optimised by evenly circumferentially arranging the nosepiece receiving portions 122 but this is not necessary.

It is hereby pointed out that the provision of the annual recesses 124 of the respective nosepiece receiving portions 122 decreases the length of the nosepiece storage unit 110 compared to an arrangement in which the annual recesses 124 are not provided and the first surface 82 of nosepieces 60 housed in the nosepiece storage unit 110 engage the planar surface portion 118 directly. Looking at FIG. 14 the annular recesses 114 are located a distance L beneath the planar surface portion 118, whereas in the absence of such annular recesses 114 the nosepiece storage unit 110, in particular the fingers 114 thereof, would need be longer by a distance L in order to have the same functionality of enabling nosepieces to be stored between the planar surface 118 and rear housing part 116 of the tool.

Figures 9, 10:
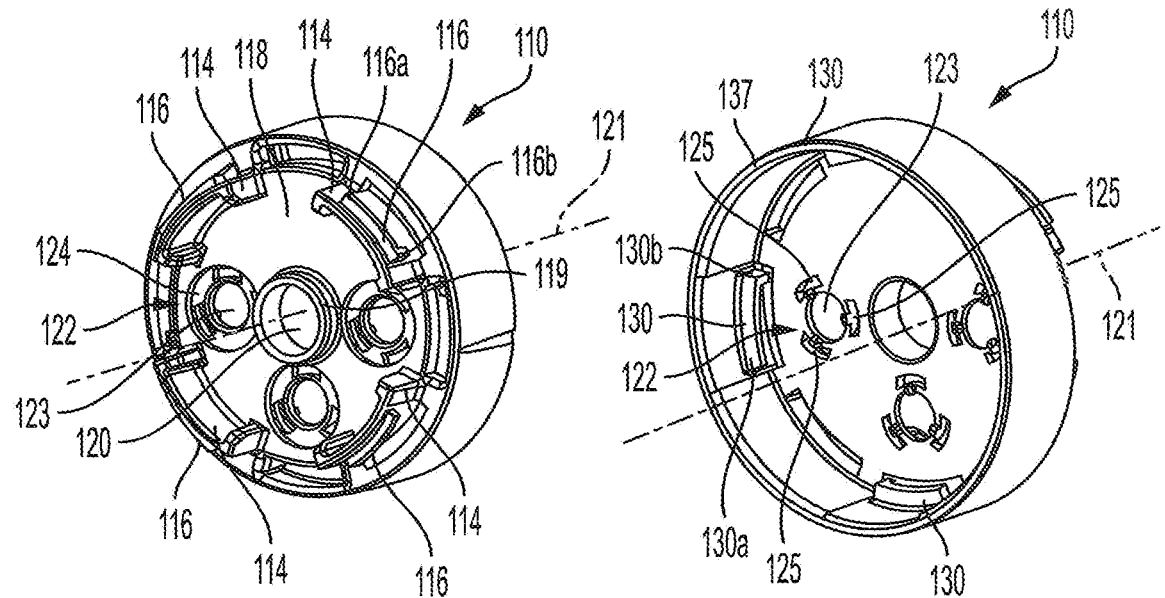
FIGS. 9 to 12 are schematic views of the nosepiece storage unit of the tool in FIG. 1 from different angles.
Figures 11, 12:
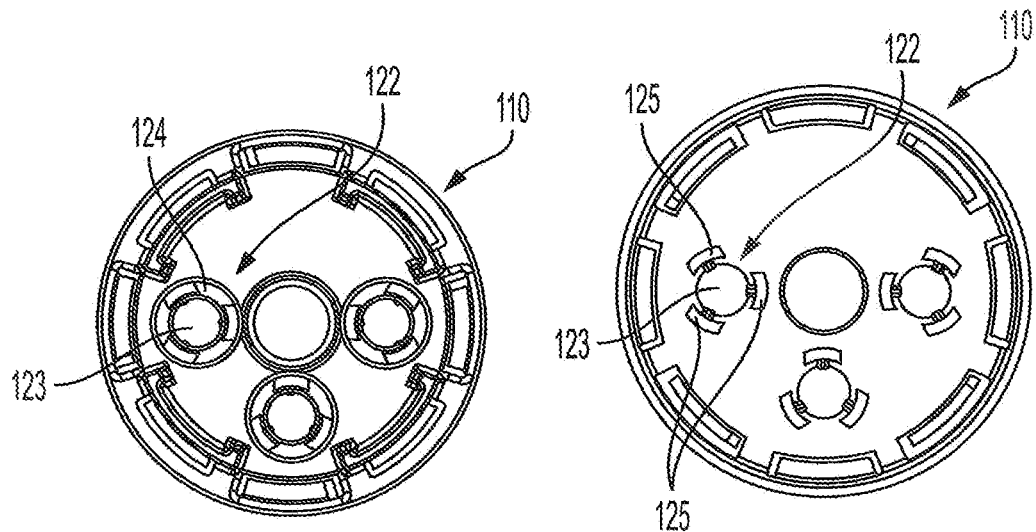

With reference to FIGS. 10 and 12 the rear-side of the nosepiece storage unit 110 is provided with attachment means, interlocking projections or thread-like projections corresponding to the aforementioned first part of the two-part engagement mechanism. In particular the nosepiece storage unit 110 is provided with four evenly circumferentially displaced inwardly extending projections 130 (only three of which are visible in FIG. 10). The projections 130 themselves are not exactly circumferentially extending and are slightly offset to a plane which is orthogonal to the aforementioned axis 121, wherein a first end 130a of each projection 130 is closer to a rear distal annular surface 137 of the nosepiece storage unit 110 than the other end 130b of each projection 130. The purpose of this rear-side attachment means will now be explained.

Figure 15:
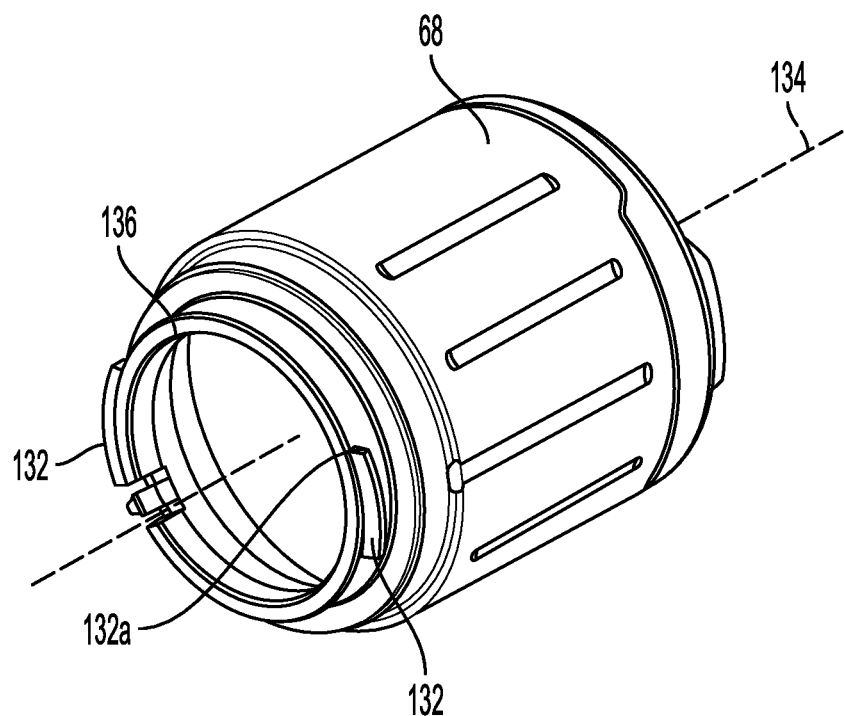
FIGS. 15 and 16 are schematic view of the collection chamber of the tool in FIG. 1 from different angles.
Figure 16:
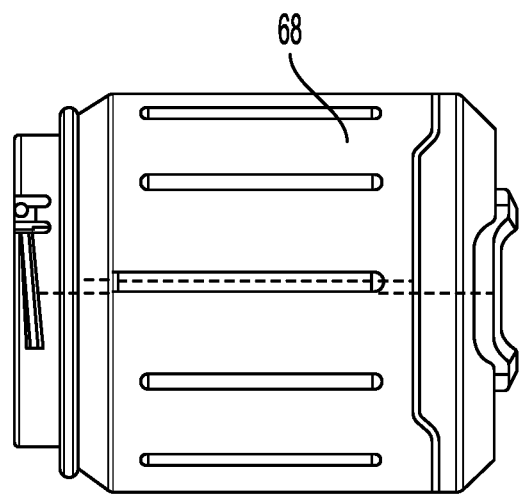

As already mentioned, the tool 10 has a collection chamber 68 for storing snapped mandrels. When the nosepiece storage unit 110 is mounted to the rear housing part 116 in the manner heretofore described the collection chamber 68 is connected to the nosepiece storage unit 110. Referring to FIGS. 15 and 16 the collection chamber 68 is provided with attachment means, interlocking projections or thread-like projections that is capable of engaging the first part of the two-part engagement mechanism (defined by either the circumferentially displaced projections 112 of the rear housing part 116 or the circumferentially displaced projections 130 of the nosepiece storage unit 110). The attachment means of the collection chamber 68 is defined by two outwardly protruding projections 132. The projections 132 themselves are not exactly circumferentially extending and are slightly offset to a plane which is orthogonal to a major axis 134 of the collection chamber 68, wherein the major axis 134 aligns with the aforementioned axis 37 when the collection chamber 68 is mounted to the tool 10. Wherein a first end 132a of each projection 132 is closer to a front end 136 of the collection chamber 68 than the other end 132b of each projection 132. The collection chamber 68 can be attached to either the rear housing part 116 of the tool or the rear-side of the nosepiece storage unit 110 by interlocking the outwardly protruding projections 132 of the collection chamber 68 with either the inwardly protruding projections 112 of the rear housing part 116 or the inwardly protruding projections 130 of the nosepiece storage unit 110. The ramped nature of the projections 112, 114, 132 provides a bayonet-type attachment mechanism whereby the collection chamber 68 is drawn towards the component to which it is attached upon twisting the collection chamber 68 in order to engage the aforementioned sets of projections.

Figure 17:
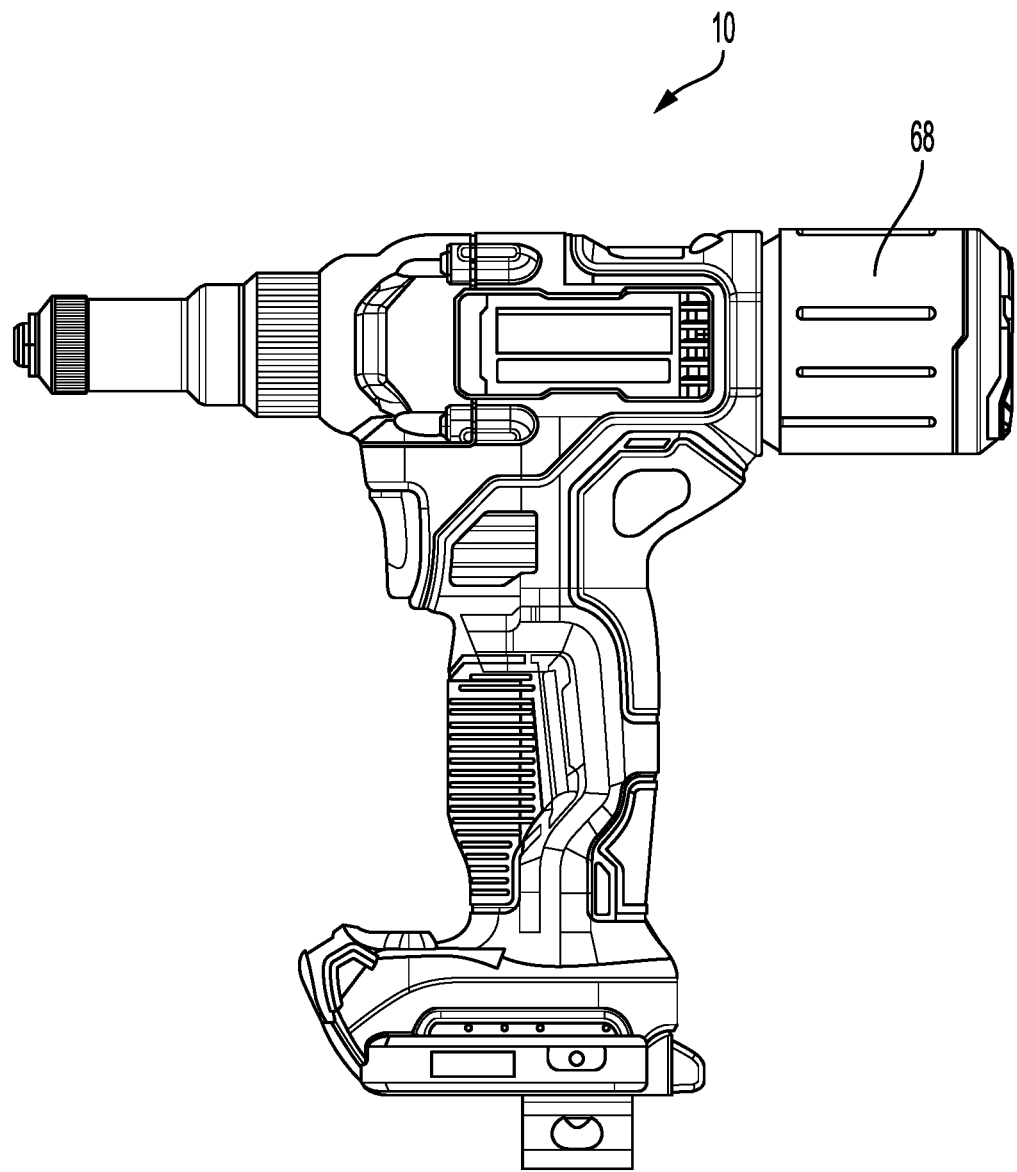
FIG. 17 is a schematic side view of the tool in FIG. 1 without the nosepiece receiving portion.

FIG. 17 shows the blind rivet setting tool 10 with the collection chamber 68 mounted to the rear housing part 116; wherein the nosepiece storage unit 110 is absent. The battery 12 is not shown in FIG. 17 and so it has been separated from the battery attachment feature of the tool 10.

Figure 18:
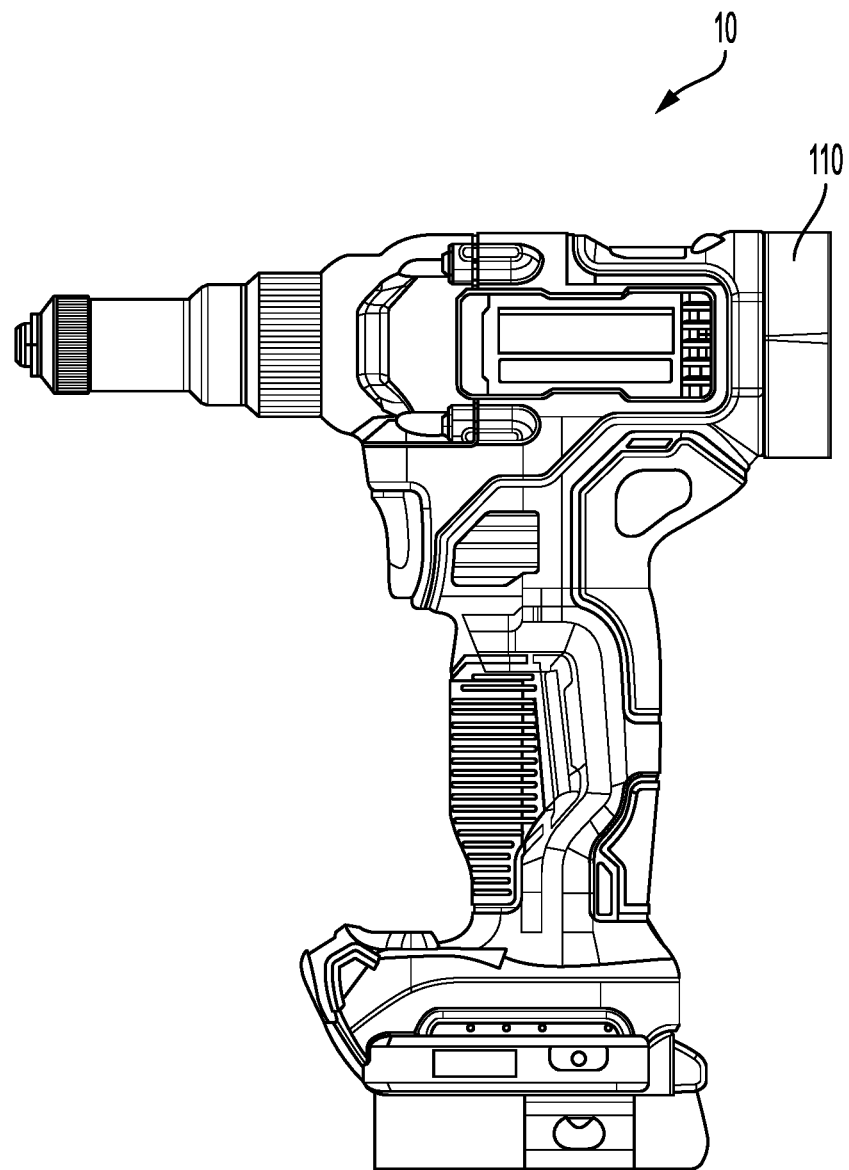
FIG. 18 is a schematic side view of the tool in FIG. 1 without the collection chamber.

FIG. 18 shows the blind rivet setting tool 10 with the nosepiece storage unit 110 mounted to the rear housing part 116; wherein the collection chamber 68 is absent. The battery 12 is not shown in FIG. 2 and so it has been separated from the battery attachment feature of the tool 10.

A user has freedom to use the blind rivet setting tool 10 with both the nosepiece storage unit 110 and collection chamber 68 as in FIG. 1, however if space restrictions are tight the user may decide to remove the nosepiece storage unit 110 and attach the collection chamber 68 to the rear housing part 116 as in FIG. 17, wherein the length of the tool is shorted compared to the length of the tool in FIG. 1. Alternatively, if space restrictions are tight a user may remove the collection chamber 68 and use the tool with the nosepiece storage unit 110 attached to the rear housing part 116 as in FIG. 18, or with no collection chamber 68 or nosepiece storage unit 110.

When the collection chamber is removed there is some probability of a broken mandrel being ejected from the rear of the tool 10 in an uncontrolled manner. In particular if a broken mandrel remains within the tool while a subsequent rivet is being set, upon breaking the mandrel and impulse may be imparted to the first mandrel remaining in the tool which could propel the mandrel out of the rear of the tool in an uncontrolled manner.

Figure 21:
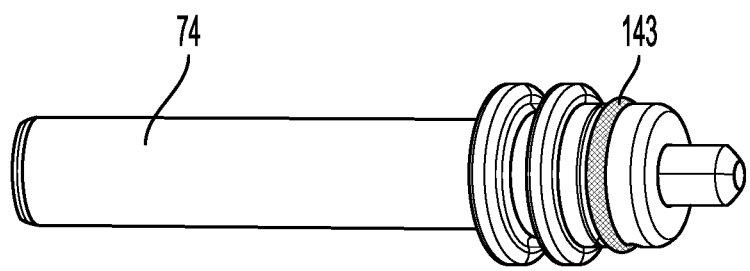
FIG. 21 is a schematic non-exploded view of the guidance sleeve in FIG. 20 with a snapped mandrel extending through it.
Figure 22:
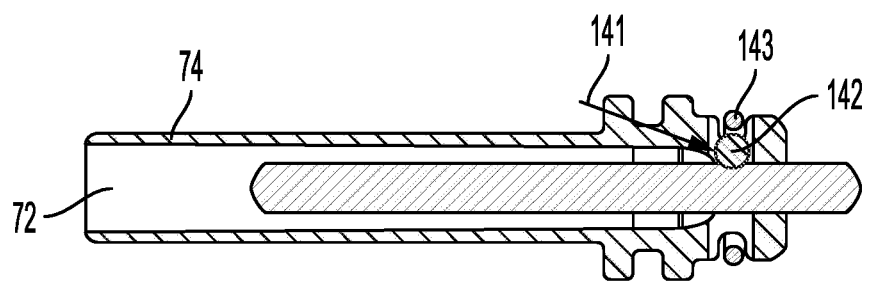
FIG. 22 is a schematic cross-sectional view of the guidance sleeve in FIG. 21 with a snapped mandrel extending through it.

Referring back to FIGS. 2 and 20 to 22 the aforementioned guidance sleeve 74 is provided with a slow-down feature 140. More specifically a recess 141 is provided in the guidance sleeve 74 which cooperates with the channel 72. A ball 142, such as a metal ball, is received in the recess 141. The recess 141 defines a conical section with a hole in communication with the channel 72 which is wide enough to let the ball 142 partially extend through the hole into the channel 72. Under bias of an elastic ring 143 the ball 142 is caused to partially protrude into the channel 72. In order for a snapped mandrel to pass through the channel 72 in a direction of the collection chamber 68 it must urge the ball 142 out of the way against the bias of the elastic ring 143 as shown in FIGS. 21 and 22 where the snapped mandrel section 147 is shown moving past the slow-down feature 140. As a result, if a broken mandrel is caused to be propelled along the channel 72 as heretofore described the slow-down feature will at least reduce its velocity.

It is envisaged that after a blind rivet has been set the mandrel thereof will be pushed along the internal path 67 by the subsequent blind rivet to be set, wherein upon its mandrel being inserted into the tool 10 it will push the former broken mandrel in a direction of the collection chamber 68. In this manner broken mandrels can be pushed past the slow-down feature 140 described in the previous paragraph.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

Figure 23:
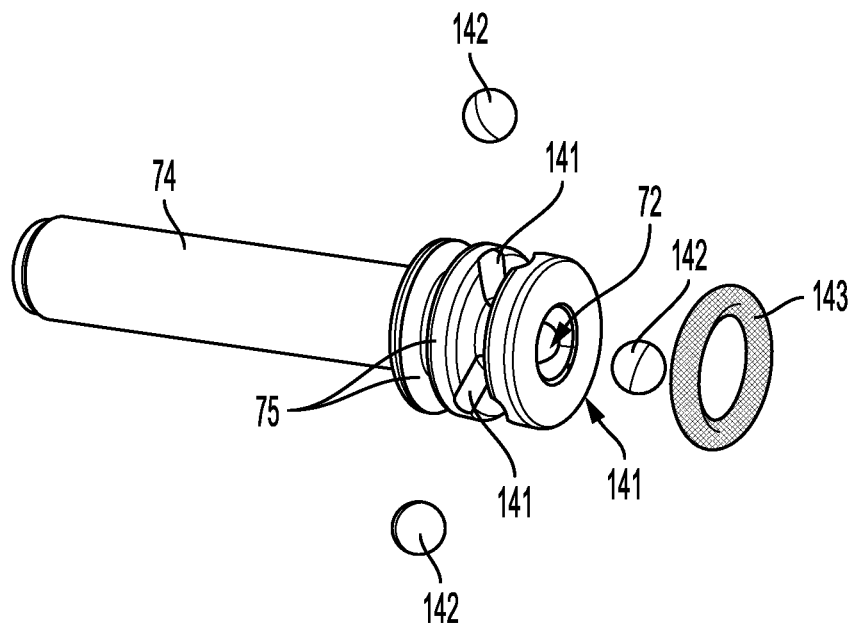
FIG. 23 is a schematic exploded view of another guidance sleeve.
Figure 24:
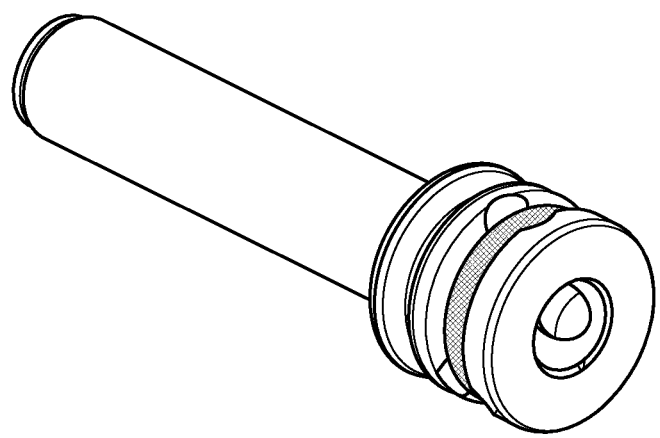
FIG. 24 is a schematic non-exploded view of the guidance sleeve in FIG. 23.

In some embodiments the slow-down feature 140 of the guidance sleeve 74 may comprise more than one metal ball 142. FIGS. 23 and 24 show an embodiment in which three evenly circumferentially displaced recesses 141 are provided around a guidance sleeve 74, each for receiving a metal ball 142, whereby the balls 142 are inwardly biased by a single elastic ring 143.

In some embodiments at least one of the cap 106, nosepiece storage unit 110 and collection chamber 68 is provided with grip means, or contour grip surface to increase grip with a users fingers in order to enable the user to twist it more easily. Looking at FIG. 7 for instance the outer surface of the cap 106 has a series of ribs for increasing the degree of friction between the cap 106 and a user's fingers to facilitate turning of the cap 106. Looking at FIG. 15 as another example the outer surface of the collection chamber 68 has a series of ribs for increasing the degree of friction between the collection chamber 68 and a user's fingers to facilitate turning of the collection chamber 68. The outer surface of the nosepiece storage unit 110 may similarly be provided with a series of ribs to facilitate turning thereof in use. It will be appreciated that a series of ribs is just one example of suitable grip means and persons skilled in the art will be able to envisage other suitable grip means such as a series of bumps instead of ribs; or a surface layer of increased friction such as a rubber layer applied to at least one of the cap 106, nosepiece storage unit 110 and collection chamber 68 in an overmolding process.

The blind rivet setting tool 10 has been described as having a ball screw mechanism for causing movement of the pullback hull 42 and thereby the jaws 44. However it will be appreciated that this is simply exemplary and other driving mechanisms for causing movement of the pullback hull 42 and thereby the jaws 44 could be used instead. For example, EP3674037A1 describes an arrangement whereby torque from an electric motor is transferred to axial pulling force via a cam feature, wherein this technology could be adapted to cause axial movement of the pullback hull 42 and jaws 44 in the heretofore described blind rivet setting tool 10.

Referring to FIGS. 7 and 8 the cap 106 is described as being threadably attachable to the jaw housing 94 for clamping a nosepiece in place. However, this is merely exemplary and other suitable attachment means will be apparent to persons skilled in the art. More generally the cap 106 may be provided with a first part of a two-part releasable connection mechanism and the jaw housing 94 may be provided with a second part of the two-part releasable connection mechanism, whereby the cap 106 can be releasably attached to the jaw housing 94 for clamping a nosepiece in place by engaging the two-part releasable connection mechanism. For example, the cap 106 may be provided with a plurality of circumferentially distributed fingers each provided with a hook feature, wherein the hook features can be caused to snap-fit into circumferentially arranged hook receiving portions provided on the jaw housing 94. Naturally such features could be reversed wherein the fingers are provided on the jaw housing 94 and hook receiving openings are provided on the cap 106.

In some embodiments the cap 106 may be hingedly connected to the jaw housing 94. In other words, a hinge connection can be provided between the cap 106 and the jaw housing 94. On the opposite side of the cap 106 to the hinge connection a first part of a two-part releasable connection mechanism is provided such as a finger provided with a hook feature or a first latch part. To clamp a nosepiece in place the cap 106 is pivoted around the hinge connection towards the jaw housing 94, thereby causing the first part of the two-part releasable connection mechanism to engage the second part of the two-part releasable connection mechanism provided on the jaw housing such as a hook receiving portion or second latch part; it will be understood that the mentioned hook feature snap-fits with the hook receiving opening.

In some embodiments the cap 106 can be releasably coupled to the jaw housing 94 for clamping a nosepiece in place via a bayonet-type attachment mechanism.

The illustrated embodiment is provided with a bayonet-type attachment mechanism for coupling the nosepiece storage unit 110 and collection chamber 68 to each other and to the rear housing part 116 of the tool 10. It will be appreciated however that this is simply exemplary and any attachment means suitable to enable such features to be releasably attached could be used instead. For example, in some embodiments the nosepiece storage unit 110 and collection chamber 68 could alternatively be threadably attached to each other and to the rear housing part 116 of the tool 10, whereby instead of bayonet-type attachment features threaded portions are provided instead to enable releasable threaded connection of such features.

Figure 19:
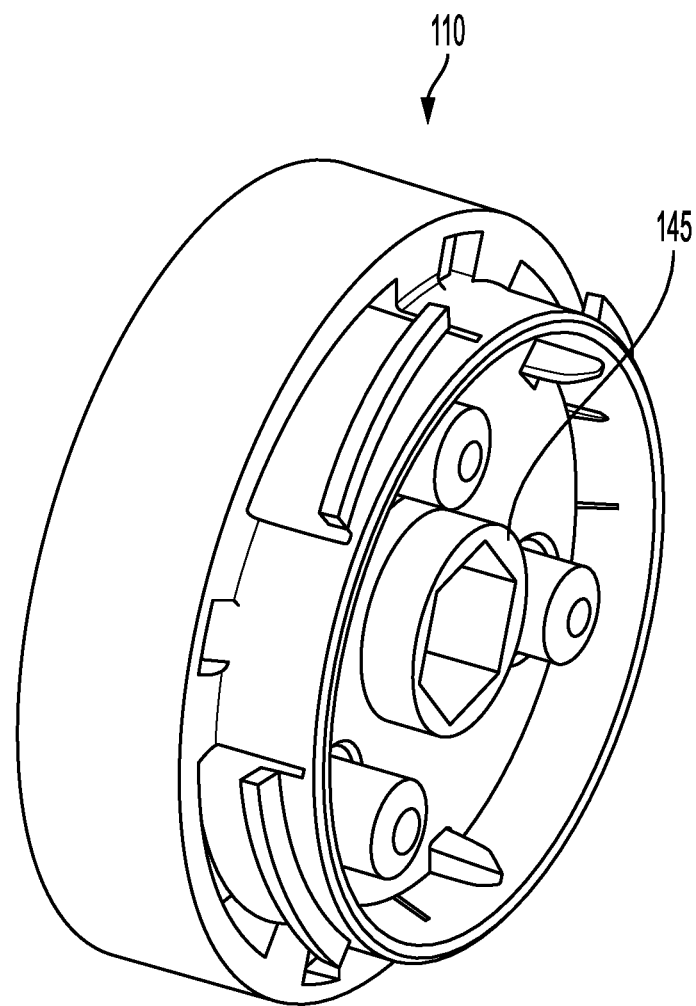
FIG. 19 is a schematic view of an alternative nosepiece receiving portion.
Figure 20:
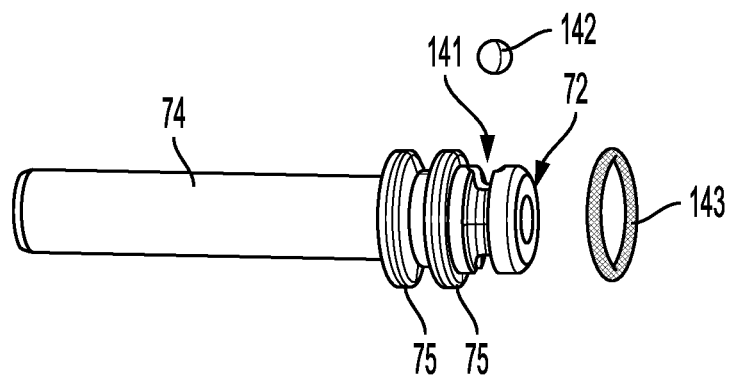
FIG. 20 is a schematic exploded view of a guidance sleeve.

In some embodiments the tool 10 described in connection with the drawings may not be provided with the connection assembly or clamping means 76 for clamping a nosepiece 60 in place. It is known for nosepieces to embody a threaded portion and for such nosepieces to be threadably attach to the nose of a blind rivet setting tool. As such with reference to FIG. 3 in some embodiments the tool 10 omits a cap 106 and the jaw housing 94 omits an externally threaded portion 96. Instead the abutment portion 98 is provided with an internal threaded portion, whereby a nosepiece can be threadably attached to the tool 10 by engaging the thread of the nosepiece with the internal threaded portion of the abutment portion 98. To facilitate rotational driving of a nosepiece, in order to ensure a tight connection and to make it easier to remove a nosepiece, a user typically uses a wrench, wherein the wrench engages with facets of the nosepiece in order to enable rotational driving of the nosepiece via the wrench. Referring to FIG. 19 in some embodiments the nosepiece storage unit 110 is provided with a wrench feature 145 for rotatably driving nosepieces. The wrench 145 is basically a modified version of the heretofore described annular lip 119, wherein instead of the lip being essentially cylindrical the inner surface defined by the lip has facets for cooperating with facets of a nosepiece to enable torque to be transferred from the nosepiece storage unit 110 to the nosepiece. This removes the need for a user to carry with them a separate wrench.

Referring to the ball/elastic band feature of the nosepiece described in connection with FIG. 4, and the ball/elastic band slow-down feature 140 described in connection with FIGS. 2 and 20 to 22 and also FIGS. 23 and 24, it will be appreciated that the provision of a ball biased partially into a channel by an elastic band is just one implementation. Persons skilled in the art will envisage other implementations that achieve the same purpose. For example, a spring may be used to bias a ball instead of an elastic band. Instead of a ball another object could be used to achieve the purpose of the ball, which is to project into a channel for restricting the movement of a body through the channel, whereby the recess in which the object is housed will need to be suitably adapted to accommodate the object and enable it to partially project into the channel to achieve the heretofore described purpose. The object partially extending into the channel could define a flat ramped surface against which a mandrel engages for pushing the object out of the way, whereby the ramped surface facilitates the mandrel in pushing the object out of the way.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

What is claimed is:

1. A blind rivet setting tool, comprising:
a jaw housing having a threaded outer surface at a distal end thereof and an abutment with an annular surface portion that extends in a plane orthogonal to a longitudinal axis of the blind rivet setting tool to define a first nosepiece receiving opening;
a nosepiece releasably attached in the first nosepiece receiving opening, the nosepiece having a channel through which a mandrel of a blind rivet is received, and a recess with a hole in communication with the channel and configured to receive a ball configured to partially protrude through the hole into the channel to grip the mandrel;
a pullback hull arranged in the jaw housing for axial movement with respect thereto;
gripping jaws arranged in the pullback hull and moveable by the pullback hull to pull the mandrel to be set in use; and
a clamp having a cap partially surrounding the pullback hull for releasable connection with the jaw housing to releasably clamp the nosepiece between the clamp and the gripping jaws in a manner that enables the blind rivet to bear against the nosepiece while the mandrel is pulled.

2. The blind rivet setting tool of claim 1, wherein the cap comprises:
a first cap portion that defines a threaded inner surface,
a second cap portion having an internal cross-section which decreases in diameter in a direction away from the threaded inner surface, and
a third cap portion having an inwardly extending annual lip defining a second nosepiece receiving opening.

3. The blind rivet setting tool of claim 2, wherein the threaded inner surface is configured for threaded engagement with the threaded outer surface of the jaw housing.

4. The blind rivet setting tool of 3, wherein the threaded outer surface comprises male threading.

5. The blind rivet setting tool of claim 2, wherein the threaded inner surface comprises female threading.

6. The blind rivet setting tool of claim 2, wherein the nosepiece further has an annular wall defining a first nosepiece surface and a second nosepiece surface that are in a plane orthogonal to a longitudinal channel axis.

7. The blind rivet setting tool of claim 6, wherein the releasable connection between the jaw housing and the clamp causes engagement of the first nosepiece surface with the jaw housing.

8. The blind rivet setting tool of claim 6, wherein the releasable connection between the jaw housing and the clamp causes engagement of the second nosepiece surface with the inwardly extending annular lip.

9. The blind rivet setting tool of claim 6, wherein the inwardly extending annular lip urges against the second nosepiece surface when the threaded inner surface of the cap is threaded onto the threaded outer surface of the jaw housing.

10. The blind rivet setting tool of claim 9, wherein the first nosepiece surface is brought into engagement with the annular surface portion of the jaw housing when the threaded inner surface of the cap is threaded onto the threaded outer surface of the jaw housing.

11. The blind rivet setting tool of claim 6, wherein the longitudinal channel axis aligns with the longitudinal axis of the blind rivet setting tool.

12. The blind rivet setting tool of claim 6, wherein the second nosepiece surface is on an opposite side of the first nosepiece surface in a longitudinal direction of the blind rivet setting tool.

13. The blind rivet setting tool of claim 1, wherein the nosepiece further has an annular ramped surface that is configured to engage a ramped surface of the gripping jaws.

14. The blind rivet setting tool of 1, wherein the clamp is engaged by threaded engagement of the cap to the jaw housing.

15. The blind rivet setting tool of 14, wherein the clamp is disengaged by threaded disengagement of the cap from the jaw housing.

16. The blind rivet setting tool of 1, wherein the clamp is engaged by rotating the cap relative to the jaw housing in a first direction to form a threaded engagement of the cap to the jaw housing.

17. The blind rivet setting tool of 16, wherein the clamp is disengaged by rotating the cap relative to the jaw housing in a second direction to produce a threaded disengagement of the cap from the jaw housing.

18. A blind rivet setting tool, comprising:
a jaw housing having a threaded outer surface at a distal end thereof and an abutment with an annular surface portion that extends in a plane orthogonal to a longitudinal axis of the blind rivet setting tool to define a first nosepiece receiving opening;
a nosepiece received in the first nosepiece receiving opening, the nosepiece having a channel through which a mandrel of a blind rivet is received, and a recess with a hole in communication with the channel and configured to receive a ball configured to partially protrude through the hole into the channel to grip the mandrel;
an axially moveable pullback hull;
gripping jaws, arranged in the pullback hull and moveable by the pullback hull to pull the mandrel to be set in use, the gripping jaws having a ramped surface configured to be engaged by the nosepiece;
a motor and a torque transmission for causing the gripping jaws to grip and pull the mandrel of the blind rivet; and
a clamp having a cap partially surrounding the pullback hull to releasably clamp the nosepiece between the clamp and the gripping jaws in a manner that enables the blind rivet to bear against the nosepiece while the mandrel is pulled, the cap having a threaded inner surface for threaded engagement with the threaded outer surface of the jaw housing and an inwardly extending annual lip defining a second nosepiece receiving opening that urges against a surface of the nosepiece when the threaded inner surface of the cap is threaded onto the threaded outer surface of the jaw housing.

19. A blind rivet setting tool, comprising:
a jaw housing having a threaded outer surface at a distal end thereof and an abutment with an annular surface portion that extends in a plane orthogonal to a longitudinal axis of the blind rivet setting tool to define a first nosepiece receiving opening;
a nosepiece received in the first nosepiece receiving opening, the nosepiece having a channel through which a mandrel of a blind rivet is received, and a recess with a hole in communication with the channel and configured to receive a ball configured to partially protrude through the hole into the channel to grip the mandrel;

an axially moveable pullback hull;
gripping jaws, arranged in the pullback hull and moveable by the pullback hull to pull the mandrel to be set in use, the gripping jaws having a ramped surface configured to be engaged by a ramped surface of the nosepiece;
a motor and a torque transmission for causing the gripping jaws to grip and pull the mandrel of the blind rivet; and
a clamp having a cap partially surrounding the pullback hull to releasably clamp the nosepiece between the clamp and the gripping jaws in a manner that enables the blind rivet to bear against the nosepiece while the mandrel is pulled, the cap having a threaded inner surface configured for threaded engagement with the threaded outer surface of the jaw housing to bring a nosepiece surface into engagement with the annular surface portion of the jaw housing.

* * * * *